United States Patent
Lee

(10) Patent No.: US 10,797,507 B2
(45) Date of Patent: Oct. 6, 2020

(54) WIRELESS CHARGING METHOD, AND APPARATUS AND SYSTEM THEREFOR

(71) Applicant: LG INNOTEK CO., LTD., Seoul (KR)

(72) Inventor: Jong Heon Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 47 days.

(21) Appl. No.: 16/096,414

(22) PCT Filed: Mar. 17, 2017

(86) PCT No.: PCT/KR2017/002891
§ 371 (c)(1),
(2) Date: Oct. 25, 2018

(87) PCT Pub. No.: WO2017/195977
PCT Pub. Date: Nov. 16, 2017

(65) Prior Publication Data
US 2019/0140469 A1  May 9, 2019

(30) Foreign Application Priority Data

May 13, 2016  (KR) .................. 10-2016-0058691

(51) Int. Cl.
*H02J 50/12* (2016.01)
*H02J 50/90* (2016.01)
(Continued)

(52) U.S. Cl.
CPC .............. *H02J 7/025* (2013.01); *H02J 5/005* (2013.01); *H02J 7/02* (2013.01); *H02J 7/027* (2013.01);
(Continued)

(58) Field of Classification Search
USPC .......................................... 320/108
See application file for complete search history.

(56) References Cited

U.S. PATENT DOCUMENTS 8,736,228 B1  5/2014  Freed et al.
2009/0284082 A1  11/2009  Mohammadian
(Continued)

FOREIGN PATENT DOCUMENTS

CN  105391114 A  3/2016
JP  2016-506228 A  2/2016
(Continued)

*Primary Examiner* — Bryce M Aisaka
(74) *Attorney, Agent, or Firm* — Birch, Stewart, Kolasch & Birch, LLP

(57) ABSTRACT

The present invention relates to a wireless charging method, and an apparatus and a system therefor. A wireless charging method in a wireless power transmitter, according to an embodiment of the present invention, may comprise the steps of: controlling transmission power on the basis feedback signal periodically received from wireless power receiver during power transmission; determining whether or not the wireless power receiver is present in a charging area during the power transmission; and maintaining the intensity of the transmission power constant if the result of the determination shows that the wireless power receiver is not present in the charging area. Therefore, the present invention is advantageous that it is possible to prevent, in advance, the power transmission from being unnecessarily stopped against a user's intention.

18 Claims, 11 Drawing Sheets

(51) Int. Cl.
  *H02J 50/10* (2016.01)
  *H02J 7/02* (2016.01)
  *H02J 5/00* (2016.01)

(52) U.S. Cl.
  CPC .............. *H02J 50/10* (2016.02); *H02J 50/12* (2016.02); *H02J 50/90* (2016.02)

(56) References Cited

U.S. PATENT DOCUMENTS

| | | | |
|---|---|---|---|
| 2013/0049484 A1* | 2/2013 | Weissentern | H02J 5/005 307/104 |
| 2014/0159651 A1 | 6/2014 | Von Novak et al. | |
| 2014/0197783 A1 | 7/2014 | Kim et al. | |
| 2016/0064997 A1 | 3/2016 | Hur et al. | |
| 2016/0329752 A1* | 11/2016 | Bae | H02J 50/40 |
| 2016/0372956 A1 | 12/2016 | Jung et al. | |
| 2017/0141605 A1 | 5/2017 | Lee et al. | |

FOREIGN PATENT DOCUMENTS

| | | |
|---|---|---|
| KR | 10-1256723 B1 | 4/2013 |
| KR | 10-2016-0007720 A | 1/2016 |
| KR | 10-2016-0028912 A | 3/2016 |
| WO | WO 2015/072777 A1 | 5/2015 |

\* cited by examiner

WIRELESS CHARGING METHOD, AND APPARATUS AND SYSTEM THEREFOR

CROSS REFERENCE TO RELATED APPLICATIONS

This application is the National Phase of PCT International Application No. PCT/KR2017/002891, filed on Mar. 17, 2017, which claims priority under 35 U.S.C. 119(a) to Patent Application No. 10-2016-0058691, filed in the Republic of Korea on May 13, 2016, all of which are hereby expressly incorporated by reference into the present application.

TECHNICAL FIELD

Embodiments relate to wireless power transmission technology and, more particularly, to a wireless charging method capable of adaptively controlling an initialization process when a wireless power receiver is not sensed without normal charging termination, and an apparatus and system therefor.

BACKGROUND ART

Recently, as information and communication technology has been rapidly developed, a ubiquitous society based on information and communication technology is being developed.

In order to connect information communication devices anytime and anywhere, sensors equipped with a computer chip having a communication function should be installed in all social facilities. Accordingly, supplying power to such devices or sensors is a new challenge. In addition, as the types of mobile devices such as music players such as Bluetooth handsets or iPods as well as mobile phones have rapidly increased, it is necessary for users to take more time and effort to charge batteries. As a method of solving such problems, wireless power transmission technology has recently attracted attention.

Wireless power transmission or wireless energy transfer refers to technology for wirelessly transmitting electric energy from a transmitter to a receiver using the magnetic induction principle. In the 1800s, electric motors or transformers using the electromagnetic induction principle began to be used and, thereafter, attempts have been made to radiate electromagnetic waves such as high-frequency waves, microwaves and lasers to transfer electric energy. Frequently used electric toothbrushes and some electric shavers are charged using the electromagnetic induction principle.

Up to now, wireless energy transfer methods may be broadly divided into magnetic induction, electromagnetic resonance and radio frequency (RF) transmission of a short-wavelength radio frequency.

The magnetic induction method uses a phenomenon that, when two coils are located adjacent to each other and then current is applied to one coil, a magnetic flux is generated to cause an electromotive force in the other coil, and is rapidly being commercialized in small devices such as mobile phones. The magnetic induction method may transfer power of up to several hundred kilowatts (kW) and has high efficiency. However, since a maximum transmission distance is 1 centimeter (cm) or less, a device to be charged should be located adjacent to a charger or the floor.

The electromagnetic resonance method uses an electric field or a magnetic field instead of using electromagnetic waves or current. The electromagnetic resonance method is rarely influenced by electromagnetic waves and thus is advantageously safe for other electronic devices and human. In contrast, this method may be used in a limited distance and space and energy transmission efficiency is somewhat low.

The short-wavelength wireless power transmission method (briefly referred to as the RF transmission method) takes advantage of the fact that energy may be directly transmitted and received in the form of radio waves. This technology is an RF wireless power transmission method using a rectenna. A rectenna is a combination of an antenna and a rectifier and means an element for directly converting RF power into DC power. That is, the RF method is technology for converting AC radio waves into DC. Recently, as efficiency of the RF method has been improved, studies into commercialization of the RF method have been actively conducted Wireless power transmission technology may be used not only in mobile related industries but also in various industries such as IT, railroads and home appliances.

Recently, studies into a wireless charging mouse have been actively conducted.

The wireless charging mouse may be charged while moving on a wireless charging mouse pad in which a wireless power transmitter is installed. However, the wireless charging mouse may escape from a chargeable area for a while according to user operation. At this time, a conventional wireless power transmitter stops power transmission to terminate charging although the user does not intend to terminate charging. When charging is terminated, power supply to the main control unit (MCU) of the wireless power receiver is stopped and thus communication with the wireless power transmitter, for example, low-power Bluetooth communication, may be disabled.

Accordingly, in the conventional wireless charging mouse system, when charging is terminated differently from the intention of the user, a procedure of sensing a receiver and establishing communication should be performed again. Therefore, charging efficiency is significantly lowered.

DISCLOSURE

Technical Problem

Embodiments provide a wireless charging method, and an apparatus and system therefor.

Embodiments provide a wireless charging method capable of adaptively controlling an initialization process when a wireless power receiver is not sensed without normal charging termination, and an apparatus and system therefor.

Embodiments provide a wireless charging method capable of minimizing an unnecessary initialization process, and an apparatus and system therefor.

The technical problems solved by the embodiments are not limited to the above technical problems and other technical problems which are not described herein will become apparent to those skilled in the art from the following description.

Technical Solution

Embodiments provide a wireless charging method, and an apparatus and system therefor.

A wireless charging method of a wireless power transmitter according to an embodiment includes controlling transmitted power based on a feedback signal periodically received from a wireless power receiver during power transmission, determining whether the wireless power receiver is present in a charging area during power transmission, and constantly maintaining a strength of the transmitted power upon determining that the wireless power receiver is not present in the charging area.

Upon determining that the wireless power receiver is present in the charging area while the strength of the transmitted power is constantly maintained, the controlling the transmitted power based on the feedback signal may be performed.

The wireless charging method may further include driving an initialization start timer upon determining that the wireless power receiver is not present in the charging area, and, when the initialization start timer expires, transmission of power to the wireless power receiver may be stopped to enter an initial phase.

Upon determining that the wireless power receiver is present in the charging area before the initialization start timer expires, the controlling the transmitted power based on the feedback information may be performed again.

The initial phase may be any one of a disable state or boot state defined in the alliance for wireless power (A4WP) standard, a selection phase defined in the wireless power consortium (WPC) standard and a standby phase defined in the power matters alliance (PMA) standard.

The wireless charging method may further include outputting a predetermined alarm signal indicating that power transmission is stopped before entering the initial phase, when the initialization start timer expires.

If a method of transmitting power to the wireless power receiver is an electromagnetic resonance method, the feedback signal may be a dynamic characteristic parameter packet defined in the alliance for wireless power (A4WP) standard.

If a method of transmitting power to the wireless power receiver is an electromagnetic induction method, the feedback signal may be a control error packet defined in the wireless power consortium (WPC) standard.

If a method of transmitting power to the wireless power receiver is an electromagnetic induction method, the feedback signal may include at least one of an increase signal, a decrease signal and a no-change signal defined in the power matters alliance (PMA) standard.

The determining whether the wireless power receiver is present in the charging area during power transmission may include determining whether the feedback signal is normally received within a predetermined time, determining that the wireless power receiver is present in the charging area, upon determining that the feedback signal is normally received within the predetermined time, and determining that the wireless power receiver is not present in the charging area, upon determining that the feedback signal is not normally received within the predetermined time.

The determining whether the wireless power receiver is present in the charging area during power transmission may include acquiring sensing information from a sensor provided in the wireless power transmitter and determining whether the wireless power receiver is present in the charging area based on the acquired sensing information.

The sensor may include at least one of an illuminance sensor, a pressure sensor, a Hall sensor, a current sensor and a voltage sensor.

The determining whether the wireless power receiver is present in the charging area during power transmission may include, when a method of transmitting power to the wireless power receiver is an electromagnetic resonance method and Bluetooth communication with the wireless power receiver is established, measuring a strength of a received signal of the Bluetooth communication, determining that the wireless power receiver is not present in the charging area when the measured strength of the received signal is equal to or less than a predetermined reference value, and determining that the wireless power receiver is not present in the charging area when the measured strength of the received signal exceeds the predetermined reference value.

In addition, in the constantly maintaining the strength of the transmitted power, the strength of the transmitted power which is constantly maintained may be determined by a strength of transmitted power adjusted based on a last received feedback information.

In the constantly maintaining the strength of the transmitted power, the strength of the transmitted power which is constantly maintained may be determined by a strength of an initially transmitted power when power transmission starts.

In the constantly maintaining the strength of the transmitted power, the strength of the transmitted power which is constantly maintained may be determined by a power strength corresponding to a category or class of the wireless power receiver.

A wireless charging method of a wireless power transmitter according to another embodiment includes controlling transmitted power based on a feedback signal periodically received from a wireless power receiver during power transmission, determining whether the wireless power receiver is present in a charging area during power transmission, decreasing a strength of the transmitted power by a predetermined level stepwise upon determining that the wireless power receiver is not present in the charging area, and stopping power transmission and entering an initial phase when the strength of the transmitted power decreases to a predetermined threshold or less.

A wireless power transmitter for wirelessly transmitting power to a wireless power receiver according to another embodiment includes a communication unit configured to receive a periodic feedback signal transmitted by the wireless power receiver during power transmission, a power converter configured to control the power transmitted to the wireless power receiver based on the feedback signal, a receiver presence confirmation unit configured to determine whether the wireless power receiver is present in a charging area during power transmission, and a controller configured to control the power converter to constantly maintain a strength of the transmitted power, upon determining that the wireless power receiver is not present in the charging area.

A wireless power transmitter for wirelessly transmitting power to a wireless power receiver according to another embodiment includes a communication unit configured to receive a periodic feedback signal transmitted by the wireless power receiver during power transmission, a power converter configured to control the power transmitted to the wireless power receiver based on the feedback signal, a receiver presence confirmation unit configured to determine whether the wireless power receiver is present in a charging area during power transmission, and a controller configured to control the power converter to decrease the strength of the transmitted power by a predetermined level stepwise, upon determining that the wireless power receiver is not present in the charging area.

In addition, the controller may control the power converter to control transmitted power based on the feedback signal when the wireless power receiver is present in the charging area before the strength of the transmitted power decreases to a predetermined threshold or less.

In addition, the controller may perform control to stop power transmission and to enable the state of the wireless power transmitter to enter an initial phase when the strength of the transmitted power decreases to a predetermined threshold or less.

Another embodiment may provide a computer-readable recording medium having recorded thereon a program for executing any one of the wireless charging methods.

The aspects of the disclosure are only a part of the preferred embodiments of the disclosure, and various embodiments based on technical features of the disclosure may be devised and understood by the person having ordinary skill in the art based on the detailed description of the disclosure.

Advantageous Effects

The effects of the method, apparatus and system according to embodiments are as follows.

Embodiments have an advantage of providing a wireless charging method capable of maximizing charging efficiency by blocking an unnecessary initialization process in advance, and an apparatus and system therefor.

Embodiments have an advantage of providing a wireless charging method optimized for a wireless charging mouse system, and an apparatus and system therefor.

Embodiments have an advantage of providing a wireless charging method minimizing a charging downtime, and an apparatus and system therefor.

The effects of the disclosure are not limited to the above-described effects and other effects which are not described herein may be derived by those skilled in the art from the following description of the embodiments of the disclosure. That is, effects which are not intended by the disclosure may be derived by those skilled in the art from the embodiments of the disclosure.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

BEST MODE

Figure 1:
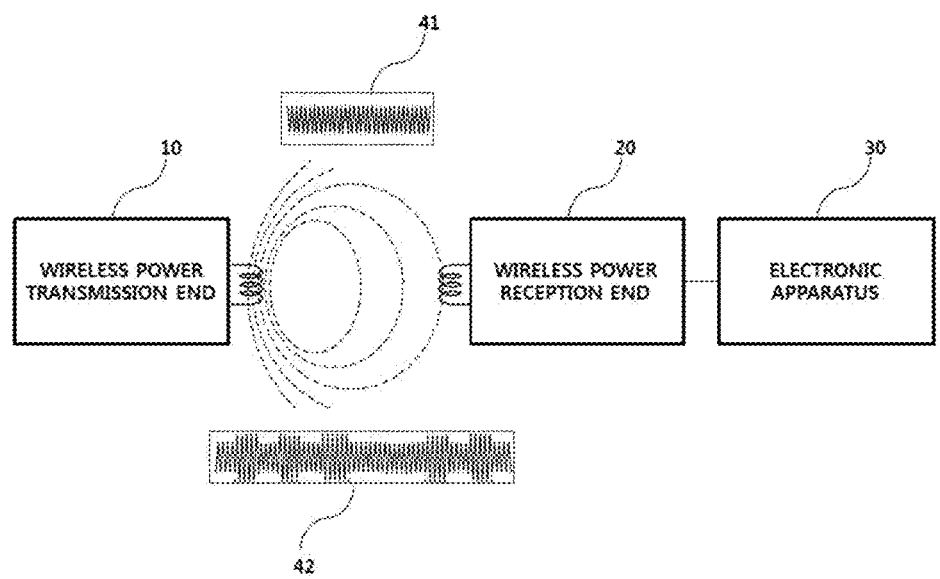
FIG. 1 is a block diagram illustrating a wireless charging system according to an embodiment.

A wireless charging method of a wireless power transmitter according to an embodiment includes controlling transmitted power based on a feedback signal periodically received from a wireless power receiver during power transmission, determining whether the wireless power receiver is present in a charging area during power transmission, and constantly maintaining a strength of the transmitted power upon determining that the wireless power receiver is not present in the charging area.

MODE FOR INVENTION

Hereinafter, apparatuses and various methods according to embodiments will be described in detail with reference to the accompanying drawings. In general, a suffix such as "module" or "unit" may be used to refer to elements or components. Use of such a suffix herein is merely intended to facilitate description of the specification, and the suffix itself is not intended to have any special meaning or function.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In the description of embodiments, an apparatus having a function for wirelessly transmitting power in a wireless charging system may be used interchangeably with a wireless power transmitter, a wireless power transmission apparatus, a wireless electric power transfer apparatus, a wireless electric power transmitter, a transmission end, a transmitter, a transmission apparatus, a transmission side, a wireless power transfer apparatus, a wireless power transferer, etc., for convenience of description. An apparatus having a function for wirelessly receiving power from a wireless power transfer apparatus may be used interchangeably with a wireless electric power reception apparatus, a wireless electric power receiver, a wireless power reception apparatus, a wireless power receiver, a reception terminal, a reception side, a reception apparatus, a receiver, etc.

The transmitter according to the embodiment may be configured in the form of a pad, a cradle, an access point (AP), a small base station, a stand, a ceiling embedded structure or a wall-mounted structure. One transmitter may transmit power to a plurality of wireless power transmission apparatuses. To this end, the transmitter may include at least one wireless power transmission means. Here, the wireless power transmission means may use various wireless power transmission standards based on an electromagnetic induction method of performing charging using the electromagnetic induction principle in which a magnetic field is generated in a power transmission-end coil and electricity is induced in a reception-end coil by the magnetic field. Here, the wireless power transmission means may include wireless charging technology of the electromagnetic induction method defined in the Wireless Power Consortium (WPC) and Power Matters Alliance (PMA) which are wireless charging technology organizations.

In addition, a receiver according to an embodiment may include at least one wireless power reception means and may simultaneously receive wireless power from two or more transmitters. For example, the wireless power reception means may include wireless charging technology of the electromagnetic induction method defined in the Wireless Power Consortium (WPC) and Power Matters Alliance (PMA) which are wireless charging technology organizations. As another example, the wireless power reception means may include wireless charging technology of the electromagnetic resonance method defined in Alliance For Wireless Power (A4WP) which is a wireless charging technology organization. As another example, the wireless power reception means may include multi-mode charging technology defined in Airfuel Alliance, which is a standard defined to adaptively receive power using both or one of an electromagnetic induction method and an electromagnetic resonance method.

The receiver according to the embodiment may be used in a small electronic apparatus such as a mobile phone, a smartphone, a laptop, a digital broadcast terminal, a personal digital assistant (PDA), a portable multimedia player (PMP), a navigation system, an MP3 player, an electric toothbrush, an electronic tag, a lighting device, a remote control, a fishing float, a wearable device such as a smart watch, etc. without being limited thereto, and may be used in any apparatus including a wireless power reception means according to embodiment to charge a battery.

FIG. 1 is a block diagram illustrating a wireless charging system according to an embodiment.

Referring to FIG. 1, the wireless charging system roughly includes a wireless power transmission end 10 for wirelessly transmitting power, a wireless power reception end for receiving the transmitted power and an electronic apparatus 30 for receiving the received power.

For example, the wireless power transmission end 10 and the wireless power reception end 20 may perform in-band communication in which information is exchanged using the same frequency band as the operating frequency used for wireless power transmission. In another example, the wireless power transmission end 10 and the wireless power reception end 20 may perform out-of-band communication in which information is exchanged using a frequency band different from the operating frequency used for wireless power transmission.

For example, the information exchanged between the wireless power transmission end 10 and the wireless power reception end 20 may include state information and control information. Here, the state information and the control information exchanged between the transmission end and the reception end will become more apparent through the following description of the embodiments.

In-band communication and out-of-band communication may provide bidirectional communication, but the embodiments are not limited thereto. In another embodiment, in-band communication and out-of-band communication may provide a unidirectional communication or half duplex communication.

For example, unidirectional communication may, without being not limited to, mean transmission of information from the wireless power reception end 20 to the wireless power transmission end 10 or transmission from the wireless power transmission end 10 to the wireless power reception end 20.

The half-duplex communication method is characterized in that bidirectional communication between the wireless power reception end 20 and the wireless power transmission end 10 is enabled but information can be transmitted only by any one device at a certain point in time.

The wireless power reception end 20 according to the embodiment may acquire a variety of state information of the electronic apparatus 30. For example, the state information of the electronic apparatus 30 may include, without being not limited to, current reception sensitivity information, current power usage information, information for identifying an executed application, CPU usage information, battery charge state information, battery output voltage/current information, etc., and may include information capable of being acquired from the electronic apparatus 30 and being used for wireless power control. The wireless power reception end 20 may transmit the variety of state information of the electronic apparatus 30 to the wireless power transmission end 10 through in-band communication or out-of-band communication.

Figure 2:
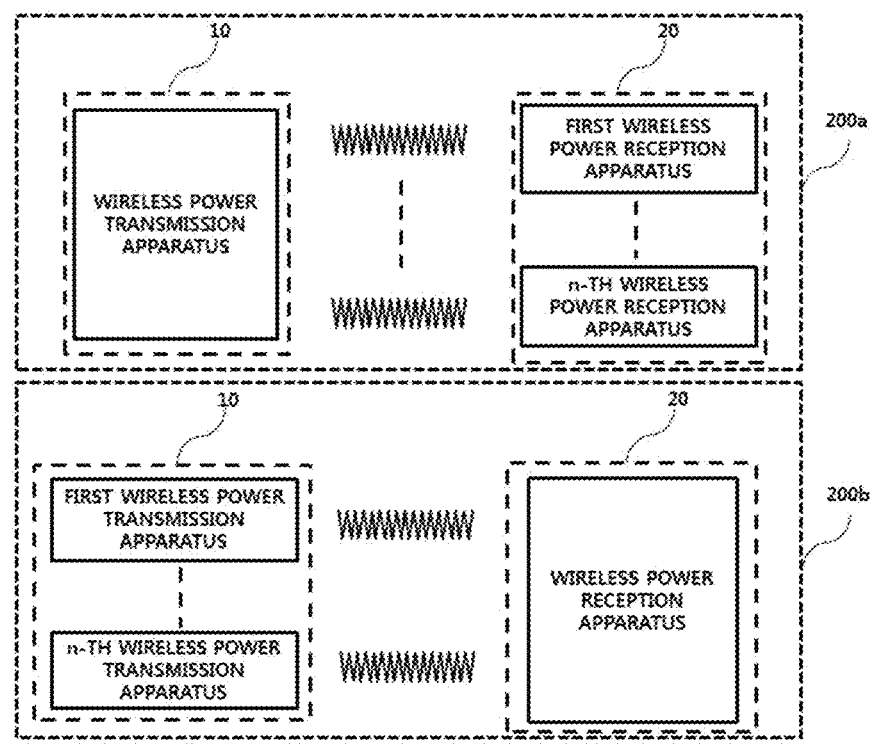
FIG. 2 is a block diagram illustrating a wireless charging system according to another embodiment.

FIG. 2 is a block diagram illustrating a wireless charging system according to another embodiment.

For example, as denoted by reference numeral 200a, the wireless power reception end 20 may include a plurality of wireless power reception apparatuses, which are connected to one wireless power transmission end 10 to perform wireless charging. At this time, the wireless power transmission end 10 may divide and transmit power to the plurality of wireless power reception apparatuses in a time-divisional manner but is not limited thereto. In another example, the wireless power transmission end 10 may divide and transmit power to the plurality of wireless power reception apparatuses using different frequency bands respectively allocated to the wireless power reception apparatuses.

At this time, the number of wireless power reception apparatuses connectable to one wireless power transmission apparatus 10 may be adaptively determined based on at least one of the required power of each wireless power reception apparatus, a battery charge state, power consumption of the electronic apparatus and available power amount of the wireless power transmission apparatus.

In another example, as denoted by reference numeral 200b, the wireless power transmission end 10 may include a plurality of wireless power transmission apparatuses. In this case, the wireless power reception end 20 may be simultaneously connected to the plurality of wireless power transmission apparatuses and may simultaneously receive power from the connected wireless power transmission apparatuses to perform charging. At this time, the number of wireless power transmission apparatuses connected to the wireless power reception end 20 may be adaptively determined based on the required power amount of the wireless power reception end 20, a battery charge state, power consumption of the electronic apparatus, available power amount of the wireless power transmission apparatus, and the reception sensitivity of the terminal equipped with the wireless power reception end 20.

Figure 3:
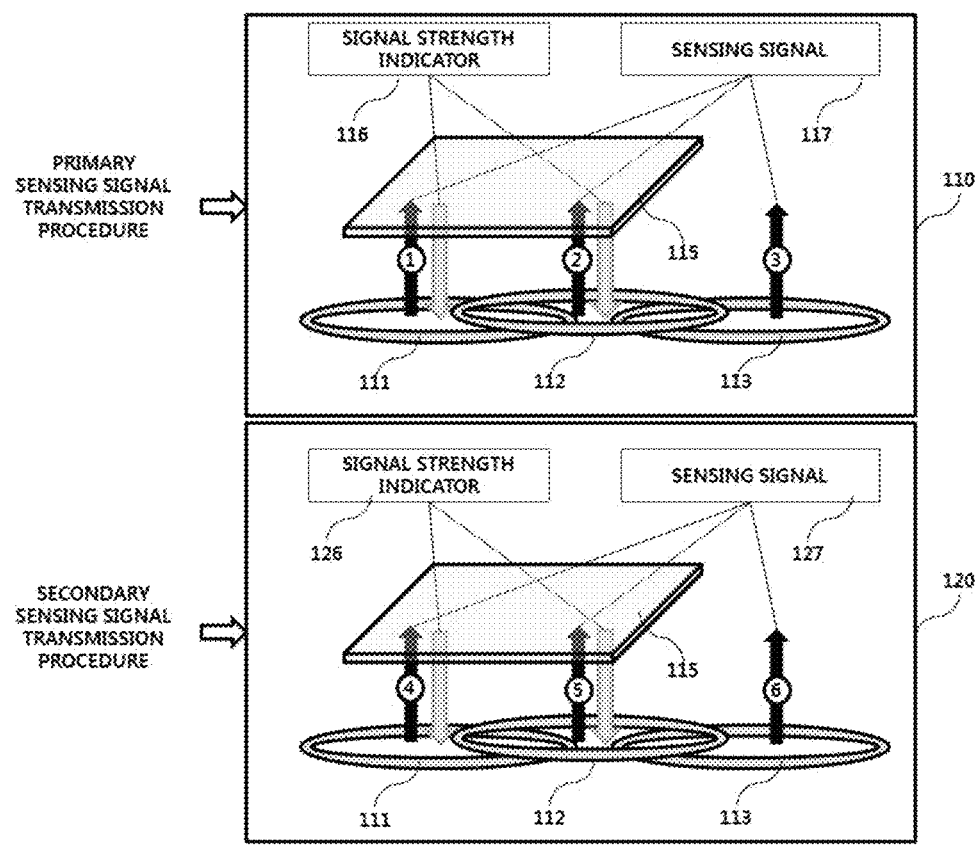
FIG. 3 is a diagram illustrating a procedure for sensing a wireless power receiver in a wireless charging system according to an embodiment.

FIG. 3 is a diagram illustrating a procedure for transmitting a sensing signal in a wireless charging system according to an embodiment.

For example, a wireless power transmitter may include three transmission coils 111, 112 and 113. Each transmission coil may partially overlap another transmission coil and the wireless power transmitter sequentially transmits predetermined sensing signals 117 and 127 for sensing presence of a wireless power receiver through each transmission coil, for example, digital ping signals, in a predefined order.

As shown in FIG. 3, the wireless power transmitter may sequentially transmit the sensing signal 117 through a primary sensing signal transmission procedure denoted by reference numeral 110 and identify the transmission coils 111 and 112 for receiving a signal strength indicator 116 (or a signal strength packet) from the wireless power receiver 115. Subsequently, the wireless power transmitter may transmit the sensing signal 127 through a secondary sensing signal transmission procedure denoted by reference numeral 120, identify a transmission coil having good power transmission efficiency (or charging efficiency), that is, good alignment between the transmission coil and the reception coil, between the transmission coils 111 and 112 which have received the signal strength indicator 126, and perform control to transmit power through the identified transmission coil, that is, perform wireless charging.

As shown in FIG. 3, the wireless power transmitter performs the two sensing signal transmission procedures in order to more accurately determine with which transmission coil the reception coil of the wireless power receiver is well aligned.

As denoted by reference numerals 110 and 120 of FIG. 3, if the signal strength indicators 116 and 126 are received in the first transmission coil 111 and the second transmission coil 112, the wireless power transmitter selects the best aligned transmission coil based on the signal strength indicator 126 received in the first transmission coil 111 and the second transmission coil 112 and performs wireless charging using the selected transmission coil.

Hereinafter, the wireless power transmission procedure defined in the WPC standard and the PMA standard supporting the electromagnetic induction method will be described in detail with reference to FIGS. 4 and 5.

Figure 4:
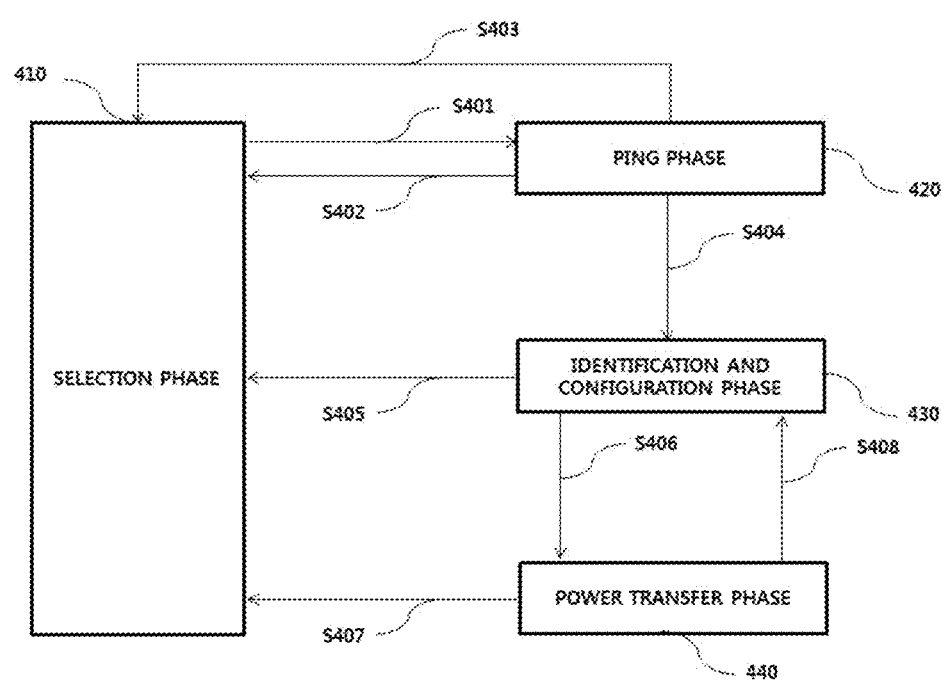
FIG. 4 is a state transition diagram explaining a wireless power transmission procedure defined in the WPC standard.

FIG. 4 is a state transition diagram explaining a wireless power transmission procedure defined in the WPC standard.

Referring to FIG. 4, transmission of power from the transmitter to the receiver according to the WPC standard may be broadly divided into a selection phase 410, a ping phase 420, an identification and configuration phase 430 and a power transfer phase 440.

The selection phase 410 may transition when power transmission starts or when a specific error or a specific event is sensed while power transmission is maintained. The specific error and the specific event will become apparent from the following description. In addition, in the selection phase 410, the transmitter may monitor whether an object is present on an interface surface. Upon sensing that the object is present on the interface surface, the transmitter may transition to the ping phase 420 (S401). In the selection phase 410, the transmitter transmits an analog ping signal having a very short pulse and sense whether an object is present in an active area of the interface surface based on change in current of the transmission coil.

In the ping phase 420, when the object is sensed, the transmitter activates the receiver and transmits a digital ping for identifying whether the receiver is compatible with the WPC standard. In the ping phase 420, when a response signal to the digital ping, for example, a signal strength packet, is not received from the receiver, the transmitter may transition to the selection phase 410 again (S402). In addition, in the ping phase 420, when a signal indicating that power transmission has been completed, that is, a charging termination signal, is received from the receiver, the transmitter may transition to the selection phase 410 (S403).

If the ping phase 420 is finished, the transmitter may transition to the identification and configuration phase 430 for identifying the receiver and collecting the configuration and state information of the receiver (S404).

In the identification and configuration phase 430, when an unexpected packet is received, when an expected packet is not received during a predetermined time (timeout), when a packet transmission error occurs, or when power transfer contract is not established (no power transfer contract), the transmitter may transition to the selection phase 410 (S405).

When identification and configuration of the receiver is finished, the transmitter may transition to the power transfer phase 240 for transferring wireless power (S406).

In the power transfer phase 440, when an unexpected packet is received, when an expected packet is not received during a predetermined time (timeout), when predetermined power transfer contract violation occurs, or when charging is terminated, the transmitter may transition to the selection phase 410 (S407).

In addition, in the power transfer phase 440, when the power transfer contract needs to be reconfigured according to transmitter status change, the transmitter may transition to the identification and configuration phase 430 (S408).

The power transfer contract may be configured based on the transmitter and receiver state information and characteristic information. For example, the transmitter state information may include information on the maximum amount of transmittable power, information on the maximum number of acceptable receivers, etc. and the receiver state information may include information on required power.

Figure 5:
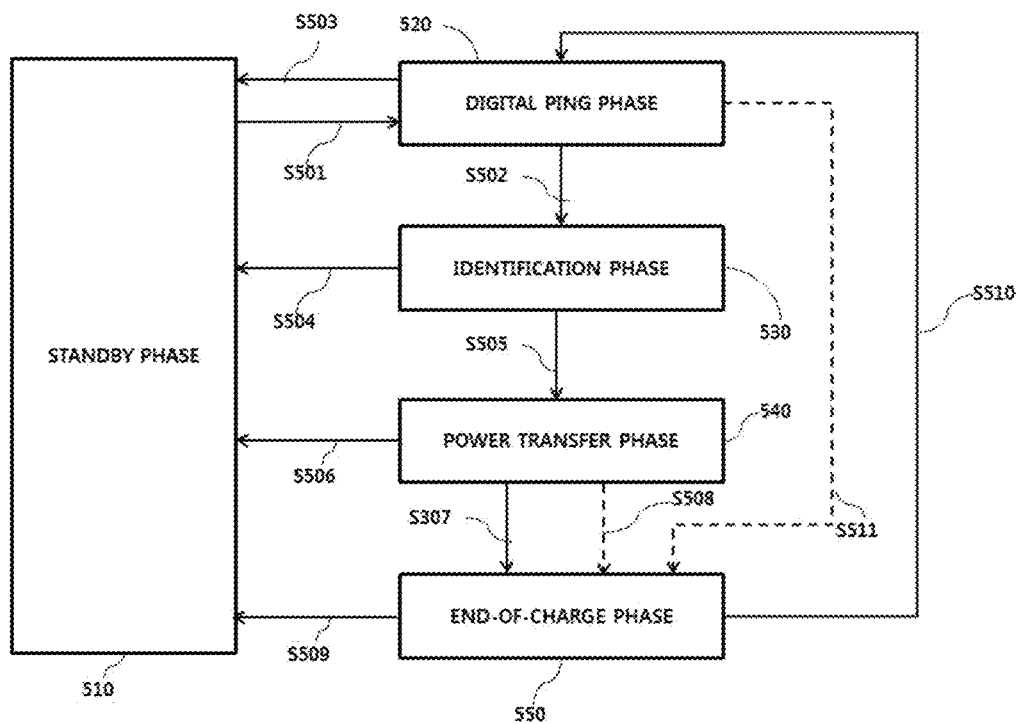
FIG. 5 is a state transition diagram explaining a wireless power transmission procedure defined in the PMA standard.

FIG. 5 is a state transition diagram explaining a wireless power transmission procedure defined in the PMA standard.

Referring to FIG. 5, transmission of power from the transmitter to the receiver according to the PMA standard may be roughly divided into a standby phase 510, a digital ping phase 520, an identification phase 530, a power transfer phase 540 and an end-of-charge phase 550.

The standby phase 510 may transition when a receiver identification procedure for power transmission is performed or when a specific error or a specific event is sensed while power transmission is maintained. The specific error and the specific event will become apparent from the following description. In addition, in the standby phase 510, the transmitter may monitor whether an object is present on a charging surface. Upon sensing that the object is present on the charging surface or when RXID retry is in progress, the transmitter may transition to the ping phase 520 (S501). Here, RXID is a unique identifier assigned to a PMA compatible receiver. In the standby phase 510, the transmitter transmits an analog ping having a very short pulse and senses whether an object is present in an active area of the interface surface, for example, a charge bed, based on change in current of the transmission coil.

The transmitter transitioning to the digital ping phase 520 transmits a digital ping signal for identifying whether the sensed object is a PMA compatible receiver. When power is sufficiently supplied to the reception end by the digital ping signal transmitted by the transmitter, the receiver may modulate the received digital ping signal according to the PMA communication protocol to transmit a predetermined response signal to the transmitter. Here, the response signal may include a signal strength packet indicating the strength of power received by the receiver. In the digital ping phase 520, the receiver may transition to the identification phase 530 (S502) when a valid response signal is received.

In the digital ping phase 520, when a response signal is not received or when the receiver is a PMA compatible receiver, that is, (foreign object detection (FOD)), the transmitter may transition to the standby phase 510 (S503). For example, a foreign object (FO) may be a metallic object including a coin, a key, etc.

In the identification phase 530, when the receiver identification procedure fails, when the reception identification procedure should be performed again, or when the receiver identification procedure is not completed in a predefined time, the transmitter may transition to the standby phase 510 (S504).

When receiver identification succeeds, the transmitter may transition from the identification phase h530 to the power transfer phase 540 to start charging (S505).

In the power transfer phase 540, when an expected signal is not received within a predetermined time (timeout), when FO is detected, or when the voltage of the transmission coil exceeds a predefined reference value, the transmitter may transition to the standby phase 510 (S506).

In addition, in the power transfer phase 540, when the temperature sensed by an internal temperature sensor exceeds a predetermined reference value, the transmitter may transition to the end-of-charge phase 550 (S507).

In the end-of-charge phase 550, upon determining that the receiver is removed from the charging surface, the transmitter may transition to the standby phase 510 (S509).

In addition, when the measured temperature drops below the reference value after a predetermined time elapses in an over-temperature state, the transmitter may transition from the end-of-charge phase 550 to the digital ping phase 520 (S510).

In the digital ping phase 520 or the power transfer phase 540, when an end-of-charge request is received from the receiver, the transmitter may transition to the end-of-charge phase 550 (S508 and S511).

Figure 6:
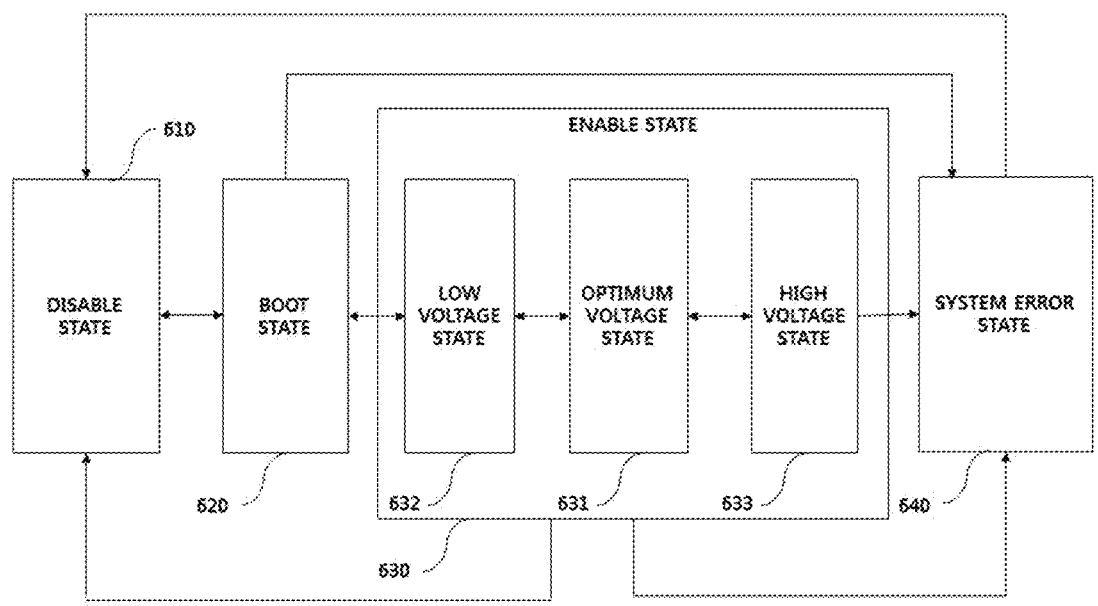
FIG. 6 is a state transition diagram of a wireless power receiver supporting an electromagnetic resonance method according to an embodiment.

FIG. 6 is a state transition diagram of a wireless power receiver supporting an electromagnetic resonance method according to an embodiment.

Referring to FIG. 6, the state of the wireless power receiver may roughly include a disable state 610, a boot state 620, an enable state 630 (or an On state) and a system error state 640.

At this time, the state of the wireless power receiver may be determined based on the strength of the output voltage of the rectifier of the wireless power receiver (referred to as $V_{RECT}$, for convenience of description).

The enable state 630 may be divided into an optimum voltage state 631, a low voltage state 632 and a high voltage state 633 according to the value of $V_{RECT}$.

The wireless power receiver in the disable state 610 may transition to the boot state 620 when the measured $V_{RECT}$ value is greater than or equal to a predefined $V_{RECT\_BOOT}$ value. In the disable state 610, the wireless power receiver may receive a beacon signal, for example, a long beacon defined in A4WP.

In the boot state 620, the wireless power receiver may transmit an advertisement signal to establish an out-of-band communication link with the wireless power transmitter and wait until the $V_{RECT}$ value reaches power required for a predetermined load.

The wireless power receiver in the boot state 620 may transition to the enable state 630 to start charging, upon determining that the $V_{RECT}$ value reaches the power required for the load.

The wireless power receiver in the enable state 630 may transition to the boot state 620 or the disable state 610, upon determining that charging is terminated or stopped.

In addition, the wireless power receiver in the enable state 630 may transition to the system error state 640 when a predetermined system error is detected. Here, the system error may include not only overvoltage, overcurrent and over-temperature but also another predefined system error condition.

In addition, the wireless power receiver in the enable state 630 may transition to the disable state 610 when the $V_{RECT}$ value decreases to the $V_{RECT\_BOOT}$ value or less.

In addition, the wireless power receiver in the boot state 620 or the system error state 640 may transition to the disable state 610 when the $V_{RECT}$ value decreases to the $V_{RECT\_BOOT}$ value or less.

Hereinafter, state transition of the wireless power receiver in the enable state 630 will be described in detail.

The operation area of the wireless power receiver according to $V_{RECT}$ in the electromagnetic resonance method will be described in detail.

If the $V_{RECT}$ value is less than a predetermined $V_{RECT\_BOOT}$ value, the wireless power receiver is maintained in the disable state 610.

Thereafter, when the $V_{RECT}$ value increases to the $V_{RECT\_BOOT}$ value or more, the wireless power receiver may transition to the boot state 620 and broadcast an advertisement signal within a predetermined time. Thereafter, when the advertisement signal is detected by the wireless power transmitter, the wireless power transmitter may transmit a predetermined connection request signal for establishing an out-of-band communication link with the wireless power receiver.

When the out-of-band communication link is normally established and registration is successfully performed, the wireless power receiver may wait until the $V_{RECT}$ value reaches a minimum output voltage of the rectifier for normal charging (hereinafter referred to as $V_{RECT\_MIN}$ for convenience of description).

When the $V_{RECT}$ value exceeds $V_{RECT\_MIN}$, the state of the wireless power receiver may transition from the boot state 620 to the enable state 630 to start to charge the load.

In the enable state 630, when the $V_{RECT}$ value exceeds $V_{RECT\_MAX}$, which is a predetermined reference value for determining overvoltage, the wireless power receiver may transition from the enable state 630 to the system error state 640.

Referring to FIG. 6, the enable state 630 may be divided into a low voltage state 632, an optimum voltage state 631 and a high voltage state 633 according to the value of $V_{RECT}$.

The low voltage state 632 may mean $V_{RECT\_BOOT} \leq V_{RECT} \leq V_{RECT\_MIN}$, the optimum voltage state 631 may mean $V_{RECT\_MIN} < V_{RECT} \leq V_{RECT\_HIGH}$, and the high voltage state 633 may mean $V_{RECT\_HIGH} < V_{RECT} \leq V_{RECT\_MAX}$.

In particular, the wireless power receiver transitioning to the high voltage state 633 may defer operation of interrupting power supplied to the load for a predetermined time (hereinafter referred to as a high voltage state holding time for convenience). At this time, the high voltage state holding time may be predetermined so as not to cause damage to the wireless power receiver and the load in the high voltage state 633.

The wireless power receiver may transmit a predetermined message indicating that overvoltage occurs to the wireless power transmitter within a predefined time through an out-of-band communication link, upon transitioning to the system error state 640.

In addition, the wireless power receiver may control the voltage applied to the load using overvoltage interruption means provided in order to prevent damage of the load due to the overvoltage. Here, an ON/OFF switch and/or a Zener diode may be used as the overvoltage interruption means.

Although the method and means for coping with a system error in the wireless power receiver when the wireless power receiver transitions to the system error state 640 due to the overvoltage are described in the above embodiment, this is merely exemplary. In another embodiment, the wireless power receiver may transition to the system error state due to overheating, over-temperature, overcurrent, etc.

For example, upon transitioning to the system error state due to overheating or over-temperature, the wireless power receiver may transmit a predetermined message indicating that overheating or over-temperature occurs to the wireless power transmitter. At this time, the wireless power receiver may drive a cooling fan, etc. to dissipate internally generated heat.

The wireless power receiver according to another embodiment may be linked with a plurality of wireless power transmitters to receive wireless power. In this case, the wireless power receiver may transition to the system error state 640, upon determining that the wireless power transmitter, from which wireless power is determined to be received, and the wireless power transmitter, with which an out-of-band communication link is established, are different from each other.

Figure 7:
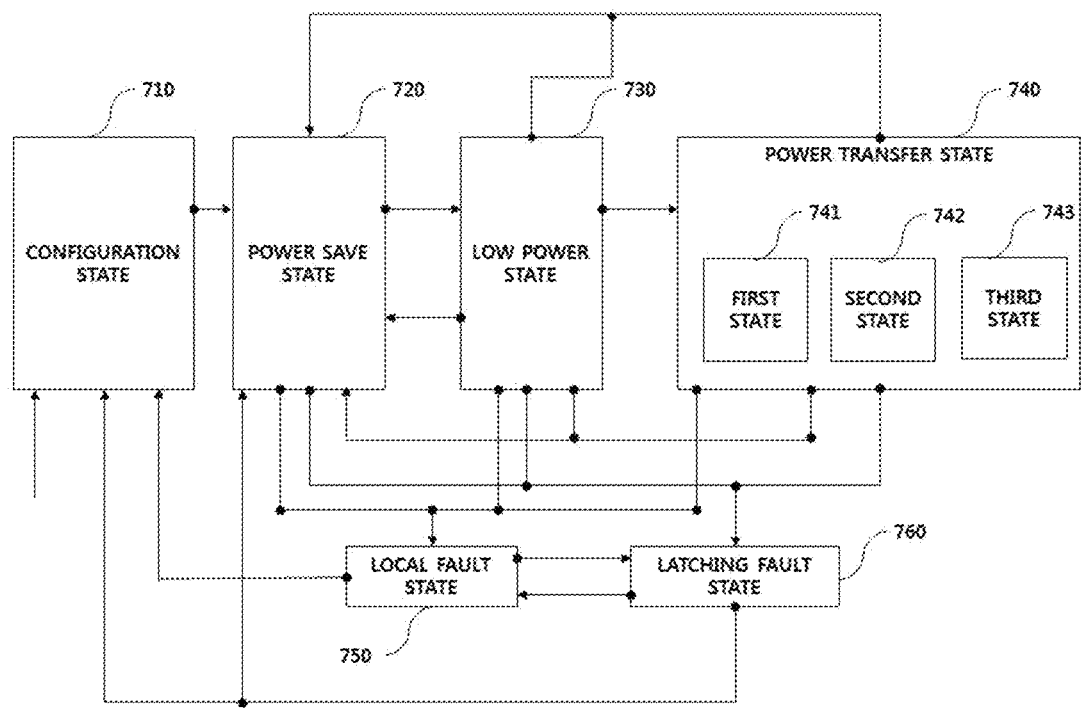
FIG. 7 is a state transition diagram illustrating a state transition procedure in a wireless power transmitter supporting an electromagnetic resonance method according to an embodiment.

FIG. 7 is a state transition diagram illustrating a state transition procedure in a wireless power transmitter supporting an electromagnetic resonance method according to an embodiment.

Referring to FIG. 7, the state of the wireless power transmitter may roughly include a configuration state 710, a power save state 720, a low power state 730, a power transfer state 740, a local fault state 750 and a latching fault state 760.

When power is applied to the wireless power transmitter, the wireless power transmitter may transition to the configuration state 710. When a predetermined reset timer expires or an initialization procedure is finished, the wireless power transmitter may transition from the configuration state 710 to the power save state 720.

In the power save state 720, the wireless power transmitter may generate and transmit a beacon sequence through a resonant frequency band.

Here, the wireless power transmitter may perform control such that a beacon sequence starts within a predetermined time after entering the power save state 720. For example, the wireless power transmitter may perform control such that the beacon sequence starts within 50 ms after transitioning to the power save state 720, without being limited thereto.

In the power save state 720, the wireless power transmitter may periodically generate and transmit a first beacon sequence for detecting whether a conductive object is present in a charging area and detect impedance variation of a reception resonator, that is, load variation.

In addition, in the power save state 720, the wireless power transmitter may periodically generate and transmit a predetermined second beacon sequence for identifying the detected object. At this time, the transmission timings of the beacons may be determined such that the first beacon sequence and the second beacon sequence do not overlap. Hereinafter, for convenience of description, the first beacon sequence and the second beacon sequence are referred to as a short beacon sequence and a long beacon sequence, respectively.

In particular, the short beacon sequence may be repeatedly generated and transmitted at a predetermined cycle $t_{CYCLE}$ during a short period $t_{SHORT\_BEACON}$ such that the standby power of the wireless power transmitter is saved until the conductive object is detected in the charging area. For example, $t_{SHORT\_BEACON}$ may be set to 30 ms or less and $t_{CYCLE}$ may be set to 250 ms±5 ms, without being limited thereto. In addition, the current strength of each short beacon included in the short beacon sequence may be greater than or equal to a predetermined reference value and may be gradually increased during a predetermined time period.

The wireless power transmitter according to the disclosure may include a predetermined sensing means for sensing reactance and resistance variation in the reception resonator according to short beacon reception.

In addition, in the power save state 720, the wireless power transmitter may periodically generate and transmit the second beacon sequence for sufficiently supplying power required for booting and response of the wireless power receiver, that is, the long beacon sequence.

That is, when booting is finished through the long beacon sequence, the wireless power receiver may broadcast and transmit a predetermined response signal to the wireless power transmitter through an out-of-band communication channel.

In particular, the long beacon sequence may be generated and transmitted at a predetermined period $t_{LONG\_BEACON\_PERIOD}$ during a relatively longer period than the short beacon sequence in order to sufficiently supply power required for booting of the wireless power receiver. For example, $t_{LONG\_BEACON}$ may be set to 105 ms+5 ms, $t_{LONG\_BEACON\_PERIOD}$ may be set to 850 ms, and the current strength of each long beacon may be relatively higher than that of the short beacon. In addition, the strength of the power of the long beacon may be constantly maintained during the transmission period.

Thereafter, when the impedance variation of the reception resonator is detected, the wireless power transmitter may wait for reception of a predetermined response signal for a long beacon transmission period. Hereinafter, for convenience of description, the response signal is referred to as an advertisement signal. Here, the wireless power receiver may broadcast an advertisement signal through an out-of-band communication frequency band different from a resonant frequency band.

For example, the advertisement signal may include at least one or any one of message identification information for identifying a message defined in the out-of-band communication standard, unique service identification information or wireless power receiver identification information for identifying whether the wireless power receiver is legal or is compatible with the wireless power transmitter, output power information of the wireless power receiver, information on a rated voltage/current applied to a load, antenna gain information of the wireless power receiver, information for identifying the category of the wireless power receiver, wireless power receiver authentication information, information indicating whether an overvoltage protection function is installed, and software version information of the wireless power receiver.

When the advertisement signal is received, the wireless power transmitter may transition from the power save state 720 to the low power state 730 and then establish an out-of-band communication link with the wireless power receiver. Subsequently, the wireless power transmitter may perform a registration procedure with respect to the wireless power receiver through the established out-of-band communication link. For example, if the out-of-band communication is Bluetooth low-power communication, the wireless power transmitter may perform Bluetooth pairing with the wireless power receiver and exchange at least one of the state information, characteristic information and control information of each other through the paired Bluetooth link.

When the wireless power transmitter transmits a predetermined control signal for starting charging, that is, a predetermined control signal for requesting transmission of power from the wireless power receiver to the load, to the wireless power receiver, the wireless power transmitter may transition from the low power state 730 to the power transfer state 740.

In the low power state 730, when the out-of-band communication link establishment procedure or the registration procedure is not normally finished, the wireless power transmitter may transition from the low power state 730 to the power save state 720.

The wireless power transmitter may drive a link expiration timer for connection with each wireless power receiver, and the wireless power receiver should transmit a predetermined message indicating that the wireless power receive is present at a predetermined period before the link expiration timer expires. The link expiration timer is reset whenever the message is received, and, when the link expiration timer does not expire, the out-of-band communication link established between the wireless power transmitter and the wireless power receiver may be maintained.

In the low power state 730 or the power transfer state 740, when all link expiration timers corresponding to the out-of-band communication link established between the wireless power transmitter and at least one wireless power receiver expire, the wireless power transmitter may transition to the power save state 720.

In addition, the wireless power transmitter in the low power state 730 may drive a predetermined registration timer upon receiving a valid advertisement signal from the wireless power receiver. At this time, when the registration timer expires, the wireless power transmitter in the low power state 730 may transition to the power save state 720. At this time, the wireless power transmitter may output a predetermined notification signal indicating that registration has failed, through notification display means provided in the wireless power transmitter, for example, an LED lamp, a display screen, a beeper, etc.

In addition, in the power transfer state 740, when charging of all of the connected wireless power receivers is completed, the wireless power transmitter may transition to the low power state 730.

In particular, the wireless power receiver may allow registration of a new wireless power receiver in states other than the configuration state 710, the local fault state 750 and the latching fault state 760.

In addition, the wireless power transmitter may dynamically control transmitted power based on the state information received from the wireless power receiver in the power transfer state 740.

At this time, the receiver state information transmitted from the wireless power receiver to the wireless power transmitter may include at least one of required power information, information on a voltage and/or current measured at the rear stage of the rectifier, state-of-charge information, information indicating an overcurrent, overvoltage, overheating and/or over-temperature state, and information indicating whether a means for interrupting or reducing power transmitted to the load is enabled according to overcurrent or overvoltage. At this time, the receiver state information may be transmitted at a predetermined period or may be transmitted whenever a specific event occurs. In addition, the means for interrupting or reducing power transmitted to the load according to overcurrent or overvoltage may be provided using at least one of an ON/OFF switch and a Zener diode.

The receiver state information transmitted from the wireless power receiver to the wireless power transmitter according to another embodiment may further include at least one of information indicating that an external power source has been connected to the wireless power receiver by wire and information indicating that an out-of-band communication method has been changed, for example, change from NFC (Near Field Communication) to BLE (Bluetooth Low Energy) communication.

The wireless power transmitter according to another embodiment may adaptively determine the strength of power to be received by each wireless power receiver based on at least one of currently available power thereof, priority of each wireless power receiver, and the number of connected wireless power receivers. The strength of power of each wireless power receiver may be determined according to a ratio of received power to maximum power capable of being processed by the rectifier of the wireless power receiver, without being limited thereto.

Thereafter, the wireless power transmitter may transmit, to the wireless power receiver, a predetermined power control command including the information on the determined power strength. At this time, the wireless power receiver may determine whether power control is possible with the strength of power determined by the wireless power transmitter and transmit a result of determination to the wireless power transmitter through a predetermined power control response message.

The wireless power receiver according to another embodiment may transmit, to the wireless power transmitter, predetermined receiver state information indicating whether wireless power control is possible according to the power control command of the wireless power transmitter, before receiving the power control command.

The power transfer state 740 may be any one of a first state 741, a second state 742 and a third state 743 according to the power reception state of the connected wireless power receiver.

For example, the first state 741 may mean that the power reception states of all of the wireless power receivers connected to the wireless power transmitter are a normal voltage state.

The second state 742 may mean that the power reception state of at least one wireless power receiver connected to the wireless power transmitter is a low voltage state and there is no wireless power receiver in a high voltage state.

The third state 743 may mean that the power reception state of at least one wireless power receiver connected to the wireless power transmitter is a high voltage state.

When a system error is detected in the power save state 720, the low power state 730 or the power transfer state 740, the wireless power transmitter may transition to the latching fault state 760.

Upon determining that all of the connected wireless power receivers are removed from the charging area, the wireless power transmitter in the latching fault state 760 may transition to the configuration state 710 or the power save state 720.

In addition, in the latching fault state 760, when local fault is detected, the wireless power transmitter may transition to the local fault state 750. When local fault is released, the wireless power transmitter in the local fault state 750 may transition to the latching fault state 760 again.

In contrast, when transitioning from any one of the configuration state 710, the power save state 720, the low power state 730 and the power transfer state 740 to the local fault state 750 and then local fault is released, the wireless power transmitter may transition to the configuration state 710.

When transitioning to the local fault state 750, the wireless power transmitter may interrupt power supplied to the wireless power transmitter. For example, the wireless power transmitter may transition to the local fault state 750 when fault such as overvoltage, overcurrent or overheating is sensed, without being limited thereto.

For example, when overcurrent, overvoltage, overheating, etc. is sensed, the wireless power transmitter may transmit a predetermined power control command for reducing the strength of the power received by the wireless power receiver to one or more connected wireless power receivers.

In another example, when overcurrent, overvoltage, overheating, etc. is sensed, the wireless power transmitter may transmit a predetermined control command for stopping charging of the wireless power receiver to at least one connected wireless power receiver.

Through the above power control procedure, the wireless power transmitter may prevent the apparatus from being damaged by overvoltage, overcurrent, overheating, etc.

When the strength of the output current of the transmission resonator is equal to or greater than a reference value, the wireless power transmitter may transition to the latching fault state 760. At this time, the wireless power transmitter transitioning to the latching fault state 760 may attempt to make the strength of the output current of the transmission resonator become equal to or less than a reference value during a predefined time. Here, the attempt may be repeated by a predetermined number of times. If the latching fault state 760 is not released despite the repeated attempt, the wireless power transmitter may transmit, to the user, a predetermination notification signal indicating that the latching fault state 760 is not released using a predetermined notification means. At this time, when all the wireless power receivers located in the charging area of the wireless power transmitter are removed from the charging area by the user, the latching fault state 760 may be released.

In contrast, when the strength of the output current of the transmission resonator decreases to the reference value or less within the predefined time or when the strength of the output current of the transmission resonator decreases to the reference value or less while the attempt is repeated, the latching fault state 760 may be automatically released. At this time, the wireless power transmitter may automatically transition from the latching fault state 760 to the power save state 720 to detect and identify the wireless power receiver again.

The wireless power transmitter in the power transfer state 740 may continuously transmit power and adaptively control transmitted power based on the state information of the wireless power receiver and a predefined optimal voltage region setting parameter.

For example, the optimal voltage region setting parameter may include at least one of a parameter for identifying a low voltage region, a parameter for identifying an optimal voltage region, a parameter for identifying a high voltage region and a parameter for identifying an overvoltage region.

The wireless power transmitter may increase transmitted power when the power reception state of the wireless power receiver is in the low voltage region and decrease transmitted power when the power reception state of the wireless power receiver is in the high voltage region.

In addition, the wireless power transmitter may control transmitted power to maximize power transmission efficiency.

In addition, the wireless power transmitter may control transmitted power such that the deviation of the amount of power required by the wireless power receiver becomes equal to or less than the reference value.

In addition, when the output voltage of the rectifier of the wireless power receiver reaches a predetermined overvoltage region, that is, when overvoltage is sensed, the wireless power transmitter may stop power transmission.

Figure 8:
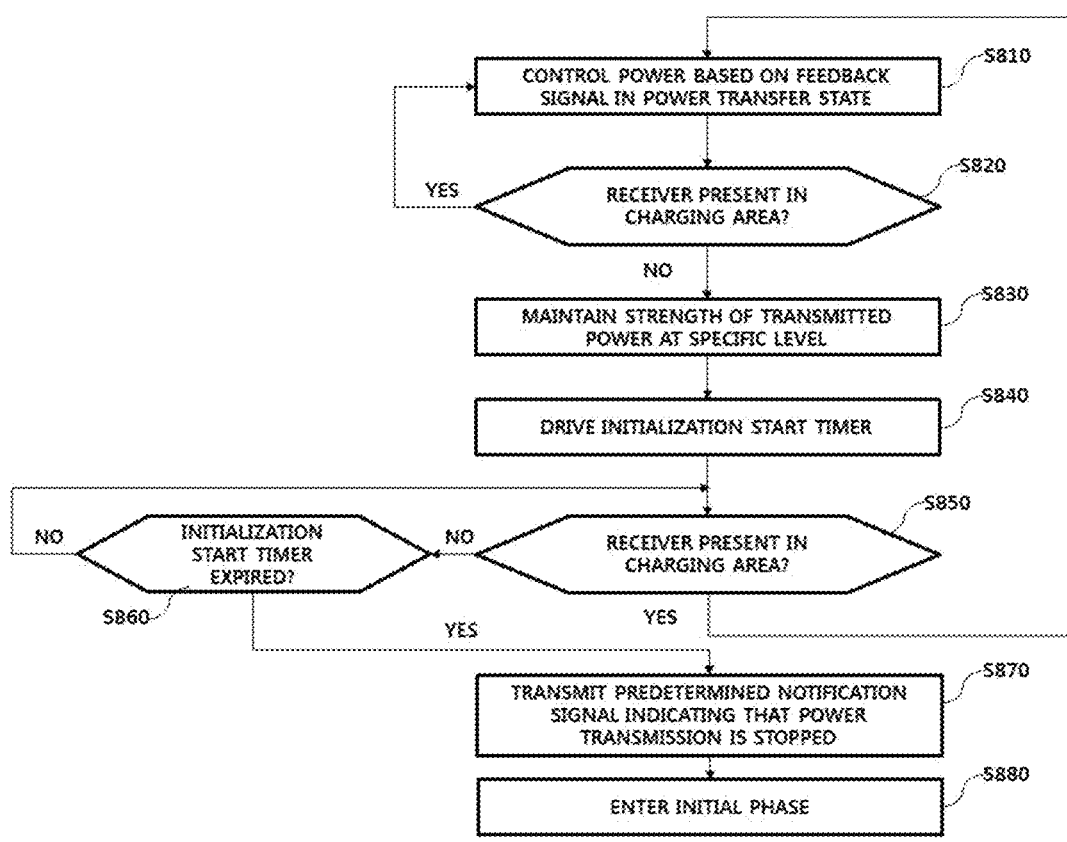
FIG. 8 is a flowchart illustrating a wireless charging method in a wireless power transmitter according to an embodiment.

FIG. 8 is a flowchart illustrating a wireless charging method in a wireless power transmitter according to an embodiment.

Referring to FIG. 8, the wireless power transmitter may perform power control based on a feedback signal periodically received from the wireless power receiver in a power transfer state or an enable state (S810).

For example, when the wireless power receiver receives power using an electromagnetic resonance method, the feedback signal may be a dynamic characteristic parameter defined in the A4WP standard. Here, the dynamic characteristic parameter signal may include not only power reception state information of the wireless power receiver but also information on required power. The power reception state information may include rectifier output voltage and current strength information, battery output voltage and current information, receiver temperature information, etc. In addition, the information on required power may include information on a minimum/maximum/set voltage required for the output end of the rectifier. At this time, the wireless power transmitter may dynamically control the strength of transmitted power based on the information on required power. For example, the wireless power receiver may be required to transmit a dynamic characteristic parameter to the connected wireless power transmitter at an interval of at least of 250 mm in the power transfer state.

In another example, when the wireless power receiver receives power using the electromagnetic induction method, the feedback signal may be a control error packet defined in the WPC standard, which is transmitted at a predetermined period in the power transmission step, without being limited thereto.

In another example, when the wireless power receiver receives power using the electromagnetic induction method, the feedback signal may include at least one of an increase signal, a decrease signal, and a no-change signal defined in the PMA standard, which are transmitted at a predetermined period in order to change the operating frequency for power control, without being limited thereto.

The wireless power transmitter may determine whether the wireless power receiver is present in the charging area (S820).

For example, whether the wireless power receiver is present in the charging area may be determined depending on whether the feedback signal is normally received during a unit time.

In another example, the wireless power transmitter may determine whether the wireless power receiver in the power transfer state is present in the charging area based on the sensing information of the sensor. Here, the sensor for determining whether the wireless power receiver is present may include, without being not limited to, an illuminance sensor, a pressure sensor, a Hall sensor, a current sensor and a voltage sensor.

In another example, when the method of transmitting power to the wireless power receiver is an electromagnetic resonance method and Bluetooth communication with the wireless power receiver is established, the wireless power transmitter may determine whether the wireless power receiver is present in the charging area based on the strength of the received signal of Bluetooth communication. For example, when the measured strength of the received signal is equal to or less than a predetermined reference value, the wireless power transmitter may determine that the wireless power receiver deviates from the charging area. In contrast, when the measured strength of the received signal exceeds the predetermined reference value, the wireless power transmitter may determine that the wireless power receiver in the power transfer state is present.

In another example, the wireless power transmitter may determine whether the wireless power receiver is present in the charging area, based on change in voltage and/or current of the transmission coil.

Upon determining that the wireless power receiver is not present in the charging area, the wireless power transmitter may constantly maintain the strength of the transmitted power at a specific level (S830).

For example, the power level maintained in step 830 may be determined based on a most recently received feedback signal, that is, a last feedback signal.

In another example, the power level maintained in step 830 may be determined by the strength of power transmitted upon transitioning to the power transfer state, that is, at a power transmission start time, that is, the strength of initially transmitted power.

In another example, the power level maintained in step 830 may be determined by a minimum power strength capable of maintaining a communication session with the wireless power receiver.

In another example, the power level maintained in step 830 may be adaptively determined based on the category or class of the wireless power receiver.

The wireless power transmitter may drive an initialization start timer (S840). Here, the initialization start timer may be used to control whether the wireless power transmitter stops power transmission and enters an initial phase. When the driven initialization start timer expires, the wireless power transmitter may stop power transmission and transition to the initial phase. For example, the initial phase may include at least one of the selection phase 410 of FIG. 4, the standby phase 510 of FIG. 5 and the disable state 610 or the boot state 620 of FIG. 6.

The wireless power transmitter may determine whether the wireless power receiver is present in the charging area while the initialization start timer is driven (S850).

At this time, the wireless power transmitter may determine whether the wireless power receiver is present in the charging area until the initialization start timer expires (S860).

When the initialization start timer expires in step 860, the wireless power transmitter may transmit a predetermined notification signal indicating that power transmission is stopped and then enter the initial phase (S870 to S880). Here, the notification signal may include, without being not limited to, an LED lamp signal, a vibration signal, a buzzer signal and a predetermined message displayed on a display screen. A specific signal capable of enabling the user to recognize that power transmission is stopped may be used.

Upon determining that the wireless power receiver is present in the charging area while the initialization start timer is driven in step 850, the wireless power transmitter may return to step 810.

For example, although the wireless charging method of FIG. 8 is applicable to a wireless charging mouse system in which presence of the wireless power receiver cannot be confirmed in a state in which a normal charging termination procedure is not performed, the disclosure is not limited thereto. The wireless charging mouse system, to which the wireless charging method according to the disclosure is applied, may maintain the power transfer state during a predetermined time without stopping power transmission or entering the initial phase, even when the wireless charging mouse deviates from the charging area, thereby minimizing unnecessary stoppage of power transmission. In addition, in the disclosure, by preventing unnecessary stoppage of power transmission, it is possible to improve user satisfaction with the wireless charging experience and to maximize charging efficiency during a unit time.

Figure 9:
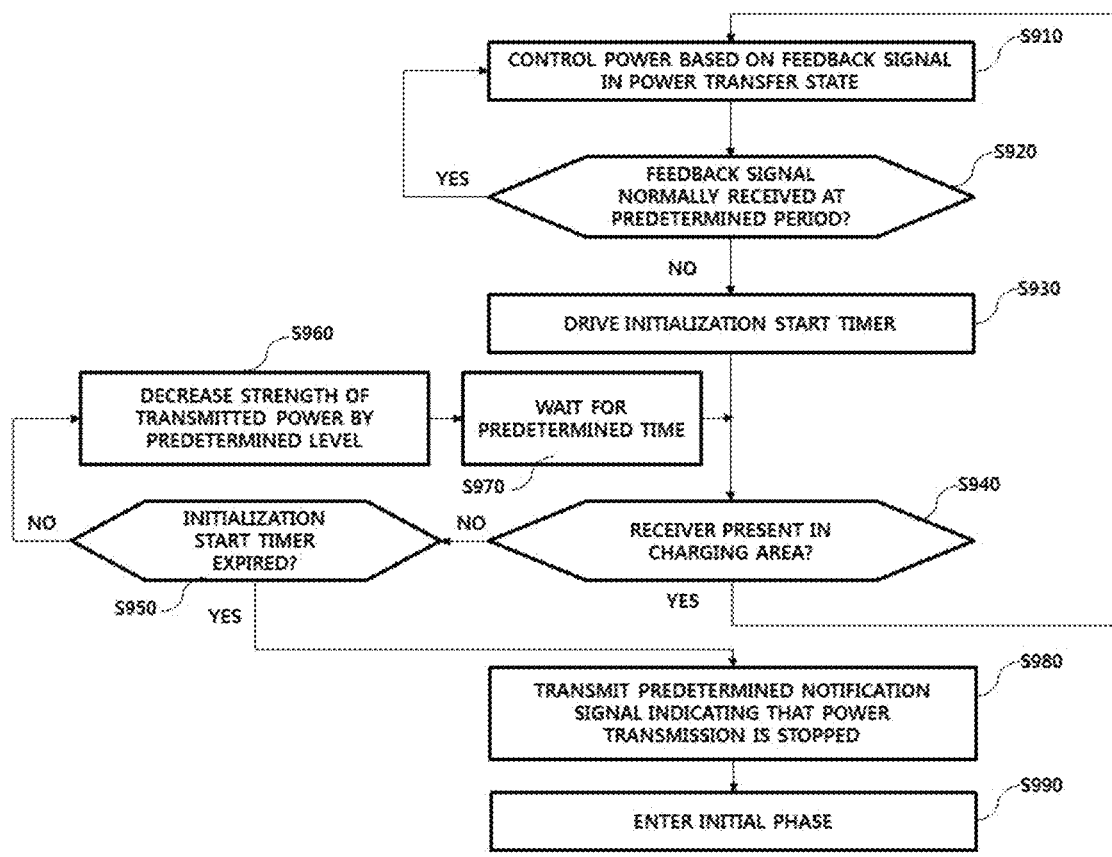
FIG. 9 is a flowchart illustrating a wireless charging method in a wireless power transmitter according to another embodiment.

In another example, the wireless charging method of FIG. 9 is applicable to a wireless power transmitter interworking with a wireless power receiver which may be frequently moved by the user during power transmission.

FIG. 9 is a flowchart illustrating a wireless charging method in a wireless power transmitter according to another embodiment.

Referring to FIG. 9, the wireless power transmitter may adaptively perform power control based on the feedback signal periodically received from the wireless power receiver in the power transfer state (S910). Here, the reception period of the feedback signal may differ according to the wireless power transmission method set between the wireless power transmitter and the wireless power receiver. In another example, the reception period of the feedback signal may be dynamically determined through a predetermined negotiation procedure between the wireless power transmitter and the wireless power receiver.

The wireless power transmitter may confirm whether the feedback signal is normally received at a predetermined period (S920). When the feedback signal is normally received at the predetermined period, the wireless power transmitter may determine that the wireless power receiver in the power transfer state is present in the charging area. In contrast, when the feedback signal is not received at the predetermined period, the wireless power transmitter may determine that the wireless power receiver in the power transfer state deviates from the charging area.

Upon determining that the feedback information is not normally received at the predetermined period, the wireless power transmitter may drive the initialization start timer (S930). Here, the initialization start timer may be used to control whether the wireless power transmitter stops power transmission and enters an initial phase. When the initialization start timer expires, the wireless power transmitter may stop power transmission and transition to the initial phase. For example, the initial phase may include at least one of the selection phase 410 of FIG. 4, the standby phase 510 of FIG. 5 and the disable state 610 or the boot state 620 of FIG. 6.

The wireless power transmitter may determine whether the wireless power receiver is present in the charging area while the initialization start timer is driven (S940). For example, the wireless power transmitter may confirm whether the feedback information is normally received at the predetermined period to determine whether the wireless power receiver is present in the charging area. That is, even when the feedback signal is not received for a while, the wireless power transmitter may continuously monitor whether the feedback signal is received until the initialization start timer expires, without stopping power transmission. Upon determining that the wireless power receiver is not present in the charging area in step 940, the wireless power transmitter may confirm whether the driven initialization start timer expires (S950).

Upon determining the initialization start timer expires, the wireless power transmitter may transmit a predetermined notification signal indicating that power transmission is stopped and then enter the initial phase (S980 to S990).

Upon determining that the initialization start timer does not expire in step 950, the wireless power transmitter may decrease the strength of the transmitted power by a predetermined level, wait for a predetermined time, and then return to step 940 (S960 to S970). Here, the decreased power level may be dynamically determined based on at least one of the category or class of the wireless power receiver, a drive time until the initialization start timer expires, and a minimum power strength for maintaining communication with the wireless power receiver, without being limited thereto.

Upon determining that the wireless power receiver is present in the charging area in step 940, the wireless power transmitter may return to step 910.

For example, although the wireless charging method of FIG. 9 is applicable to a wireless charging mouse system in which presence of the wireless power receiver may not be confirmed in a state in which a normal charging termination procedure is not performed, the disclosure is not limited thereto. The wireless charging mouse system, to which the wireless charging method according to the disclosure is applied, may decrease the strength of transmitted power stepwise for a predetermined time without stopping power transmission or entering the initial phase, even when the wireless charging mouse deviates from the charging area, thereby minimizing unnecessary stoppage of power transmission. In addition, in the disclosure, by preventing unnecessary stoppage of power transmission, it is possible to improve user satisfaction with the wireless charging experience and to maximize charging efficiency during a unit time.

In another example, the wireless charging method of FIG. 9 is applicable to a wireless power transmitter interworking with a wireless power receiver which may be frequently moved by the user during power transmission.

Figure 10:
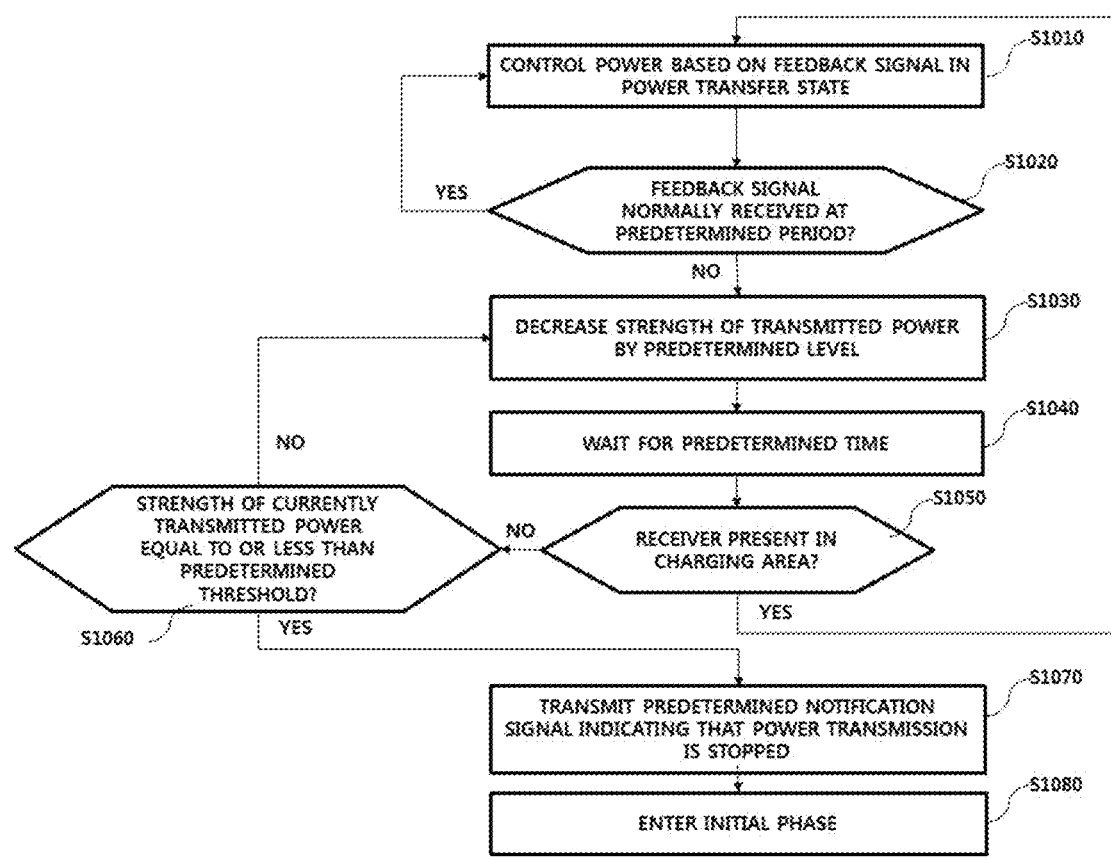
FIG. 10 is a flowchart illustrating a wireless charging method in a wireless power transmitter according to another embodiment.

FIG. 10 is a flowchart illustrating a wireless charging method according to another embodiment.

Referring to FIG. 10, the wireless power transmitter may adaptively perform power control based on the feedback signal periodically received from the wireless power receiver in the power transfer state or the enable state through out-of-band communication or in-band communication (S1010). Here, the reception period of the feedback signal may differ according to the wireless power transmission method set between the wireless power transmitter and the wireless power receiver. In another example, the reception period of the feedback signal may be dynamically determined through a predetermined negotiation procedure between the wireless power transmitter and the wireless power receiver.

The wireless power transmitter may confirm whether the feedback signal is normally received at a predetermined period (S1020).

Upon determining that the feedback signal is not normally received, the wireless power transmitter may decrease the strength of the currently transmitted power by a predetermined level and wait for a predetermined time (S1030 to S1040). The decreased power level may be dynamically determined based on the category or class of the wireless power receiver, without being limited thereto.

The wireless power transmitter may determine whether the wireless power receiver is present in the charging area (S1050). For example, the wireless power transmitter may confirm whether the feedback signal is normally received at a predetermined period to determine whether the wireless power receiver is present in the charging area. That is, even when the feedback signal is not received for a while, the wireless power transmitter may decrease the strength of the transmitted power stepwise until the strength of the transmitted power reaches a predetermined threshold, without stopping power transmission.

Upon determining that the wireless power receiver is present in the charging area in step 1050, the wireless power transmitter may return to step 1010.

In contrast, upon determining that the wireless power receiver is not present in the charging area in step 1050, the wireless power transmitter may confirm whether the strength of the currently transmitted power is equal to or less than the predetermined threshold (S1060).

Upon determining that the strength of the currently transmitted power is equal to or less than the predetermined threshold, the wireless power transmitter may transmit a predetermined notification signal indicating that power transmission is stopped and then enter the initial phase (S1070 to S1080).

Upon determining that the strength of the currently transmitted power exceeds the predetermined threshold, the wireless power transmitter may perform step 1030.

For example, although the wireless charging method of FIG. 10 is applicable to a wireless charging mouse system in which presence of the wireless power receiver cannot be confirmed in a state in which a normal charging termination procedure is not performed, the disclosure is not limited thereto. The wireless charging mouse system, to which the wireless charging method according to the disclosure is applied, may decrease the strength of transmitted power stepwise for a predetermined time without stopping power transmission or entering the initial phase, even when the wireless charging mouse deviates from the charging area, thereby minimizing unnecessary stoppage of power transmission. In addition, in the disclosure, by preventing unnecessary stoppage of power transmission, it is possible to improve user satisfaction with the wireless charging experience and to maximize charging efficiency during a unit time.

In another example, the wireless charging method of FIG. 10 is applicable to a wireless power transmitter interworking with a wireless power receiver which may be frequently moved by the user during power transmission.

Figure 11:
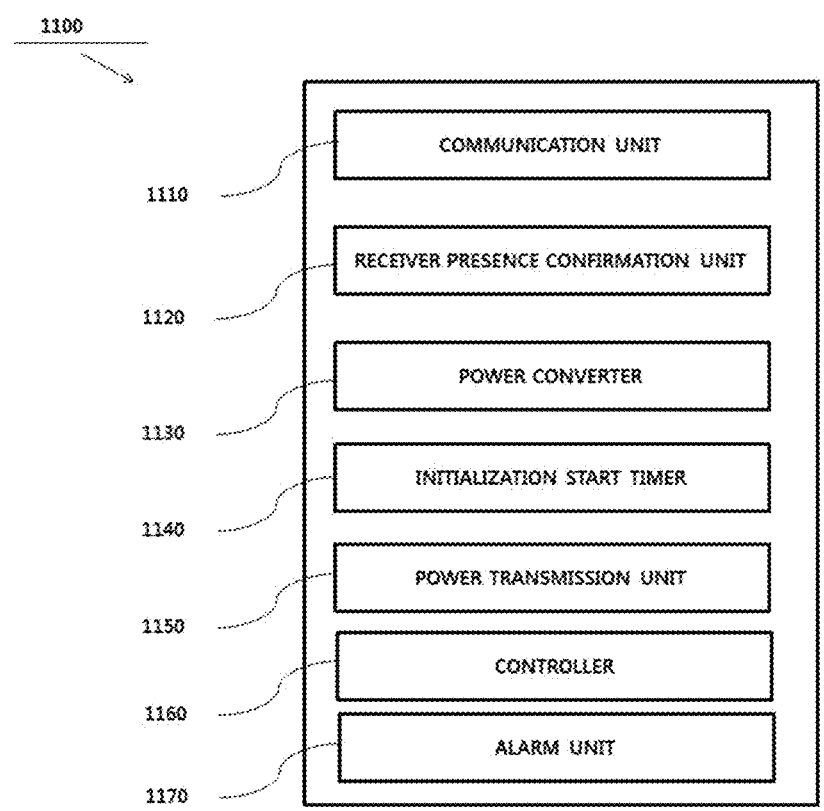
FIG. 11 is a block diagram of a wireless power transmitter according to an embodiment.

FIG. 11 is a block diagram of a wireless power transmitter according to an embodiment.

Referring to FIG. 11, the wireless power transmitter 1100 may include at least one of a communication unit 1110, a receiver presence confirmation unit 1120, a power converter 1130, an initialization start timer 1140, a power transmission unit 1150, a controller 1160 and an alarm unit 1170. The components of the wireless power transmitter 1100 shown in FIG. 11 are not essential and some components may be changed or deleted or a new component may be added.

The wireless power transmitter 1100 according to the disclosure may transmit power using at least one of the electromagnetic resonance method and the electromagnetic induction method, thereby charging the wireless power receiver.

The communication unit 1110 may modulate a packet or message received from the controller 1160 and transmit the modulated packet or message to the wireless power receiver or may transmit a packet or message acquired by demodulating a wireless signal to the controller 1160. The modulated signal may be transmitted to the wireless power receiver according to in-band communication or out-of-band communication according to the enabled wireless power transmission method.

The receiver presence confirmation unit 1120 may confirm whether the wireless power receiver is present in the charging area.

For example, the receiver presence confirmation unit 1120 may confirm whether the wireless power receiver is present in the charging area depending on whether the feedback signal is normally received in the power transfer state in cooperation with the communication unit 1110. The receiver presence confirmation unit 1120 may determine that the wireless power receiver is present in the charging area, upon determining that the feedback signal is normally received at the predefined period. In contrast, the receiver presence confirmation unit 1120 may determine that the wireless power receiver in the power transfer state deviates from the charging area, upon determining that the feedback signal is not normally received.

In another example, the receiver presence confirmation unit 1120 may determine whether the wireless power receiver in the power transfer state is present in the charging area based on the sensing information of the sensor (not shown). Here, the sensor for determining whether the wireless power receiver is present may include, without being not limited to, an illuminance sensor, a pressure sensor, a Hall sensor, a current sensor and a voltage sensor.

The power converter 1130 may adjust the strength of power transmitted through the power transmission unit 1150 according to the control signal of the controller 1160. The power converter 1130 may include, without being not limited to, an AC-DC converter for converting AC power received from an external power supply (not shown) into DC power, an amplification circuit for amplifying the converted DC power, etc.

The power converter 1130 may maintain the strength of transmitted power at a specific level according to a predetermined control signal of the controller 1160.

In addition, the power converter 1130 may decrease the strength of transmitted power by a predetermined level stepwise according to the predetermined control signal of the controller 1160 until the strength of transmitted power reaches a predetermined threshold.

In addition, the power converter 1130 may interrupt transmission of power to the power transmission unit 1150 according to a predetermined control signal of the controller 1160.

The initialization start timer 1140 may be driven according to the predetermined control signal of the controller 1160, when presence of the wireless power receiver in the charging area is not confirmed while transmitting power to the wireless power receiver.

When the initialization start timer 1140 expires, the controller 1160 stops transmission of power to the wireless power receiver and enables the wireless power transmitter 1100 to enter the initial phase.

In addition, when the initialization start timer 1140 expires, the controller 1160 may control the alarm unit 1170 to output a predetermined alarm signal indicating that power transmission is stopped.

Upon determining that the wireless power receiver is present in the charging area before the driven initialization start timer 1140 expires, the controller 1160 may stop driving of the initialization start timer 1140 and control transmitted power based on the feedback signal received from the wireless power transmitter.

The power transmission unit 1150 may include, without being not limited to, a frequency generator for generating an operating frequency corresponding to a currently enabled wireless power transmission method, a transmission coil for wirelessly transmitting an AC signal modulated with an operating frequency, etc.

The method according to the foregoing embodiments may be implemented as code that can be written to a computer-readable recording medium and can thus be read by a computer. Examples of the computer-readable recording medium include a ROM, a RAM, a CD-ROM, a magnetic tape, a floppy disk, an optical data storage, and a carrier wave (e.g., data transmission over the Internet).

The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

Those skilled in the art will appreciate that the disclosure may be carried out in other specific ways than those set forth herein without departing from the spirit and essential characteristics of the disclosure.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The disclosure is applicable to a wireless charging field and, more particularly, is applicable to a wireless power transmission apparatus and a wireless power reception apparatus.

The invention claimed is:

1. A wireless charging method of a wireless power transmitter, the wireless charging method comprising:
controlling transmitted power from the wireless power transmitter based on a feedback signal periodically received from a wireless power receiver during power transmission while the wireless power receiver is present in a charging area of the wireless power transmitter;
determining whether the wireless power receiver is present in the charging area of the wireless power transmitter during the power transmission of the transmitted power; and
in response to determining that the wireless power receiver is no longer present in the charging area, constantly maintaining a strength of the transmitted power while the wireless power receiver is absent from the charging area of the wireless power transmitter,
wherein, in the constantly maintaining the strength of the transmitted power, the strength of the transmitted power which is constantly maintained is determined by any one of a strength of transmitted power adjusted based on a last received feedback information, a strength of an initially transmitted power when the power transmission starts, and a power strength corresponding to a category or class of the wireless power receiver.

2. The wireless charging method according to claim 1, wherein, upon determining that the wireless power receiver is present in the charging area while the strength of the transmitted power is constantly maintained, the controlling the transmitted power controlled based on the feedback signal is performed.

3. The wireless charging method according to claim 1, further comprising driving an initialization start timer upon the determining that the wireless power receiver is no longer present in the charging area,
wherein, when the initialization start timer expires, the power transmission of the transmitted power to the wireless power receiver is stopped to enter an initial phase.

4. The wireless charging method according to claim 3, wherein, upon determining that the wireless power receiver is present in the charging area before the initialization start timer expires, the controlling the transmitted power based on the feedback information is performed again.

5. The wireless charging method according to claim 3, wherein the initial phase is any one of a disable state or boot state defined in alliance for wireless power (A4WP) standard, a selection phase defined in wireless power consortium (WPC) standard and a standby phase defined in power matters alliance (PMA) standard.

6. The wireless charging method according to claim 3, further comprising outputting a predetermined alarm signal indicating that the power transmission has stopped before entering the initial phase, when the initialization start timer expires.

7. The wireless charging method according to claim 1, wherein, if a method of transmitting power to the wireless power receiver is an electromagnetic resonance method, the feedback signal is a dynamic characteristic parameter packet defined in alliance for wireless power (A4WP) standard,
wherein, if a method of transmitting power to the wireless power receiver is an electromagnetic induction method, the feedback signal is a control error packet defined in the wireless power consortium (WPC) standard,
wherein, if a method of transmitting power to the wireless power receiver is an electromagnetic induction method, the feedback signal includes at least one of an increase signal, a decrease signal and a no-change signal defined in power matters alliance (PMA) standard.

8. The wireless charging method according to claim 1, wherein the determining whether the wireless power receiver is present in the charging area during the power transmission includes:
determining whether the feedback signal is normally received within a predetermined time;
determining that the wireless power receiver is present in the charging area, upon determining that the feedback signal is normally received within the predetermined time; and
determining that the wireless power receiver is not present in the charging area, upon determining that the feedback signal is not normally received within the predetermined time.

9. The wireless charging method according to claim 1, wherein the determining whether the wireless power receiver is present in the charging area during the power transmission includes:
acquiring sensing information from a sensor provided in the wireless power transmitter; and
determining whether the wireless power receiver is present in the charging area based on the acquired sensing information,
wherein the sensor includes at least one of an illuminance sensor, a pressure sensor, a Hall sensor, a current sensor and a voltage sensor.

10. The wireless charging method according to claim 1, wherein the determining whether the wireless power receiver is present in the charging area during the power transmission includes:
when a method of transmitting power to the wireless power receiver is an electromagnetic resonance method and Bluetooth communication with the wireless power receiver is established, measuring a strength of a received signal of the Bluetooth communication;
determining that the wireless power receiver is not present in the charging area when the measured strength of the received signal is equal to or less than a predetermined reference value; and
determining that the wireless power receiver is not present in the charging area when the measured strength of the received signal exceeds the predetermined reference value.

11. A wireless charging method of a wireless power transmitter, the wireless charging method comprising:
controlling transmitted power from the wireless power transmitter based on a feedback signal periodically received from a wireless power receiver during power transmission while the wireless power receiver is present in a charging area of the wireless power transmitter;
determining whether the wireless power receiver is present in the charging area of the wireless power transmitter during the power transmission of the transmitted power;
in response to determining that the wireless power receiver is no longer present in the charging area, decreasing a strength of the transmitted power by a predetermined level stepwise to a decreased level and transmitting the transmitted power at the decreased level while the wireless power receiver is not present in the charging area; and
in response to the strength of the transmitted power being decreased to a predetermined threshold or less, stopping the power transmission of the transmitted power and entering an initial phase.

12. A wireless power transmitter comprising:
a communication unit configured to receive a periodic feedback signal transmitted by a wireless power receiver during power transmission of transmitted power by the wireless power transmitter while the wireless power receiver is present in a charging area of the wireless power transmitter;
a power converter configured to control the transmitted power to the wireless power receiver based on the feedback signal;
a receiver presence confirmation unit configured to determine whether the wireless power receiver is present in the charging area of the wireless power transmitter during the power transmission of the transmitter power; and
a controller configured to:
in response to determining that the wireless power receiver is no longer present in the charging area, control the power converter to constantly maintain a strength of the transmitted power,
wherein the strength of the transmitted power which is constantly maintained is determined by any one of a strength of transmitted power adjusted based on a last received feedback information, a strength of an initially transmitted power when the power transmission starts, and a power strength corresponding to a category or class of the wireless power receiver.

13. The wireless power transmitter according to claim 12, wherein, upon determining that the wireless power receiver is present in the charging area while the strength of the transmitted power is constantly maintained, the controller controls the power converter to perform transmission power control based on the feedback signal, wherein, upon the determining that the wireless power receiver no longer present in the charging area while the strength of the transmitted power is constantly maintained, the controller drives an initialization start timer, wherein, when the initialization start timer expires, the power transmission of the transmitted power to the wireless power receiver is stopped to enter an initial phase, wherein, upon determining that the wireless power receiver is present in the charging area before the initialization start timer expires, the controller controls the power converter to perform transmission power control based on the feedback signal.

14. The wireless power transmitter according to claim 13, wherein the initial phase is any one of a disable state or boot state defined in alliance for wireless power (A4WP) standard, a selection phase defined in wireless power consortium (WPC) standard and a standby phase defined in power matters alliance (PMA) standard.

15. The wireless power transmitter according to claim 12, further comprising an alarm unit outputting a predetermined alarm signal indicating that the power transmission has stopped before entering the initial phase, when the initialization start timer expires.

16. The wireless power transmitter according to claim 12, wherein, if a method of transmitting power to the wireless power receiver is an electromagnetic resonance method, the feedback signal is a dynamic characteristic parameter packet defined in alliance for wireless power (A4WP) standard, wherein, if a method of transmitting power to the wireless power receiver is an electromagnetic induction method, the feedback signal is a control error packet defined in the wireless power consortium (WPC) standard, wherein, if a method of transmitting power to the wireless power receiver is an electromagnetic induction method, the feedback signal includes at least one of an increase signal, a decrease signal and a no-change signal defined in power matters alliance (PMA) standard.

17. The wireless power transmitter according to claim 12, wherein the receiver presence confirmation unit determines whether the feedback signal is normally received within a predetermined time, determines that the wireless power receiver is present in the charging area, upon determining that the feedback signal is normally received within the predetermined time, and determines that the wireless power receiver is not present in the charging area, upon determining that the feedback signal is not normally received within the predetermined time.

18. The wireless power transmitter according to claim 12, wherein the receiver presence confirmation unit determines whether the wireless power receiver is present in the charging area based on a sensing information acquired from a sensor provided in the wireless power transmitter, wherein the sensor includes at least one of an illuminance sensor, a pressure sensor, a Hall sensor, a current sensor and a voltage sensor.

* * * * *